Nov. 29, 1966    E. M. KELLY    3,288,295
TANK COVER STRUCTURE
Filed Dec. 7, 1962    2 Sheets-Sheet 1

INVENTOR.
EARL M. KELLY
BY *Robert R. Finch*
ATTORNEY

Nov. 29, 1966     E. M. KELLY     3,288,295

TANK COVER STRUCTURE

Filed Dec. 7, 1962     2 Sheets-Sheet 2

INVENTOR.
EARL M. KELLY

*Robert R. Finch*
ATTORNEY

United States Patent Office 3,288,295
Patented Nov. 29, 1966

3,288,295
TANK COVER STRUCTURE
Earl M. Kelly, Hillsborough, Calif., assignor to The Eimco Corporation, Salt Lake City, Utah, a corporation of Delaware
Filed Dec. 7, 1962, Ser. No. 243,082
1 Claim. (Cl. 210—194)

This invention relates generally to equipment for use in handling gas-evolving materials, such as putrescibles encountered in sewage treatment and the like, during processing or storage.

It is the primary object of the invention to provide a container in which such material may be contained in varying quantities and degrees of gas evolution, provision being made to confine the materials and the evolved gas for controlled withdrawal of either or both.

It is a further important object to provide apparatus of the type described which facilitates mixing of the tank contents despite confinement under pressured conditions.

A typical application of this type of equipment is the digestion of sewage sludge wherein the sludge is processed in a tank while undergoing mixing, raw sludge being fed thereto and liquid or sludge digestion products withdrawn separately from the evolved gas, the latter being withdrawn from the top of the tank.

In operations of this kind it is desirable and indeed necessary to confine the gas against escape. This is required for several reasons. For instance, the gas is not only noxious in character, it is also highly flammable. Moreover, anaerobic digestion processes are conducted in the absence of air hence, an additional need for confinement is to limit the presence of atmospheric oxygen. Further, the maintenance of a substantially constant pressure in the freeboard is desirable for optimum operation.

Digestion equipment has heretofore taken several forms employing a variety of gas-confining tank covers. Among the more successful prior designs are those utilizing a flat cover resting on the upper surface of the material in the tank to rise and fall with the level thereof.

Although the flat type of cover has been generally successful and widely employed, it is still not all that is to be desired. Illustratively, a flat cover floats directly on the upper surface of the liquid thus necessitating the use of a dome for gas collection and take-off. Also, flat covers are susceptible to tilting because of gas pockets forming therebeneath. Tilting is magnified during periods of sludge agitation and often becomes so severe as to cause the cover to bind in the guides employed to stabilize its vertical movement. This upsets equilibrium of the entire operation and requires constant vigilance to prevent or correct such occurrences.

An additional disadvantage of flat covers is the deleterious effect on mixing of the tank contents. This is caused by the frictional resistance of the cover which sets up a wall effect on the liquid thus effecting a stilling of flow patterns within the tank.

Another disadvantage of flat covers is the need to provide insulation against heat loss thus increasing weight and cost.

By the present invention there is provided an apparatus, and a method of using the same, which overcomes the foregoing disadvantages and achieves the stated objects by providing a stable floating cover to confine evolved gas while minimizing any instability effects of the rise or fall of the liquid level in tanks; and at the same time to provide ample freedom of movement of the tank contents to enable mixing the same as if a cover were not present and indeed to facilitate the desired flow during mixing.

Additionally, the cover structure of the invention provides an integral gas collecting and withdrawal pocket which insures rapid controlled removal of the gas.

An important related object is the provision of a cover of design such that the cover and confined gas provide insulation thereby obviating the need for added insulation, and at the same time providing a centrally located freeboard space to facilitate mixing.

In general, the foregoing and other objects are attained by a construction which includes a tank, a cover adapted to rise and fall within the margins of said tank for confining liquid and evolved gas therein.

The cover is, in accordance with the invention, made as a dome having its high point located interiorly of the tank wall and provided around its outer edge with an annular trough to provide peripheral buoyance. The cover is guided to rise and fall in a predetermined path within the tank and, in a special embodiment, is additionally provided with integrally mounted mixing apparatus extending into the sludge content of the tank to provide, in combinations with the mixer, a superior mixing assembly.

The annular trough concentrates buoyant forces at the periphery of the cover thus maintaining the central dome area out of contact with the tank contents thereby providing automatically an insulating freeboard area in which gas accumulates and from which it may be removed controllably by a suitable gas take-off. Moreover, concentration of buoyance at the periphery provides a positive stability thereby eliminating the tilting problem.

The dome shape of the cover aids, rather than hinders, mixing of the tank contents by giving positive direction to induced flow.

In summary then, the cover of the present invention, which is designed specifically for use in combination with a tank, envisions a cover formed from a sheet, convex when viewed from above, having formed integrally therewith adjacent its periphery a buoyancy-providing trough.

The trough, which may be closed to form an annular plenum chamber, is of such width and volume as to provide the entire support for the cover to maintain the center spaced above the liquid. When the trough is formed as a closed chamber, additional insulating benefits are derived.

The foregoing and other objects of the invention will be apparent from the following description of the accompanying drawings which is to be taken as ilustrative, and not in limitation, of the invention, the scope of which is defined by the appended claims and the equivalents thereof rather than by such detailed description.

Figure 1:
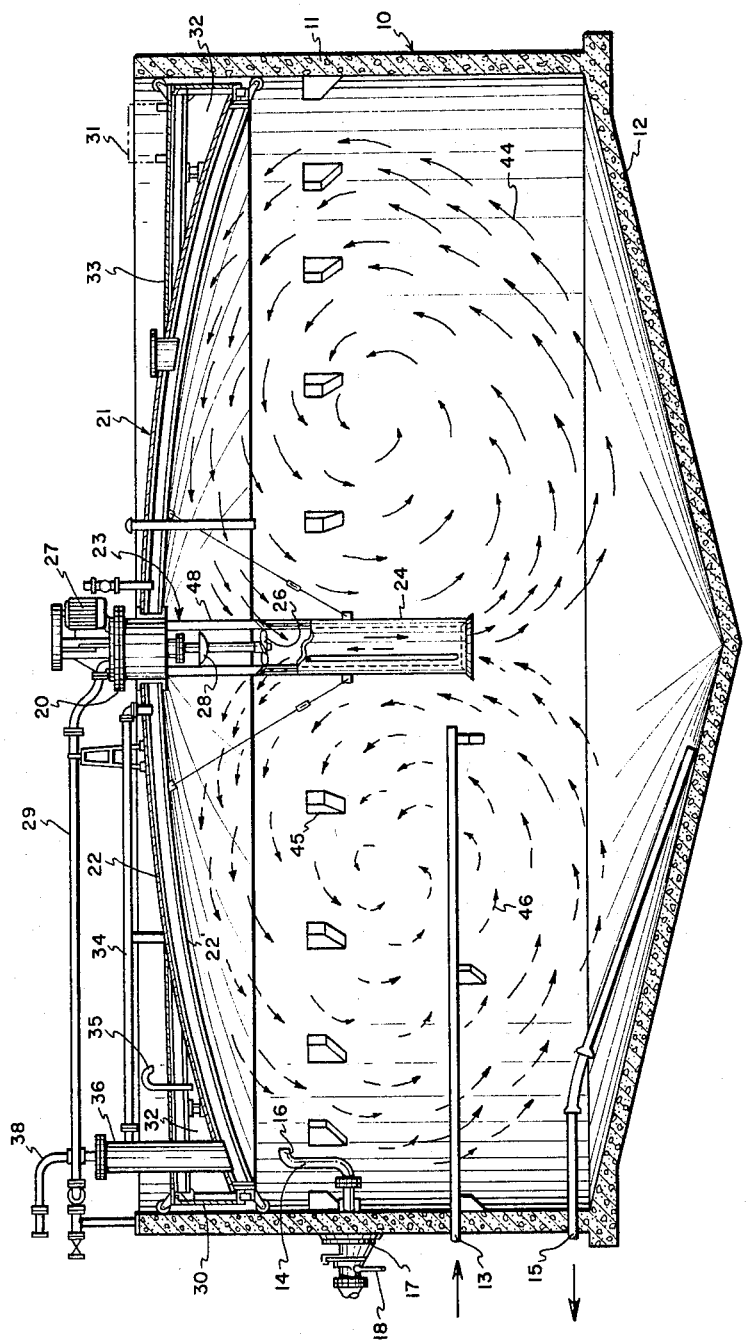
FIG. 1 is a side sectional view of a tank and cover structure embodying the invention, certain parts being shown in elevation for purposes of clarity.
Figure 2:
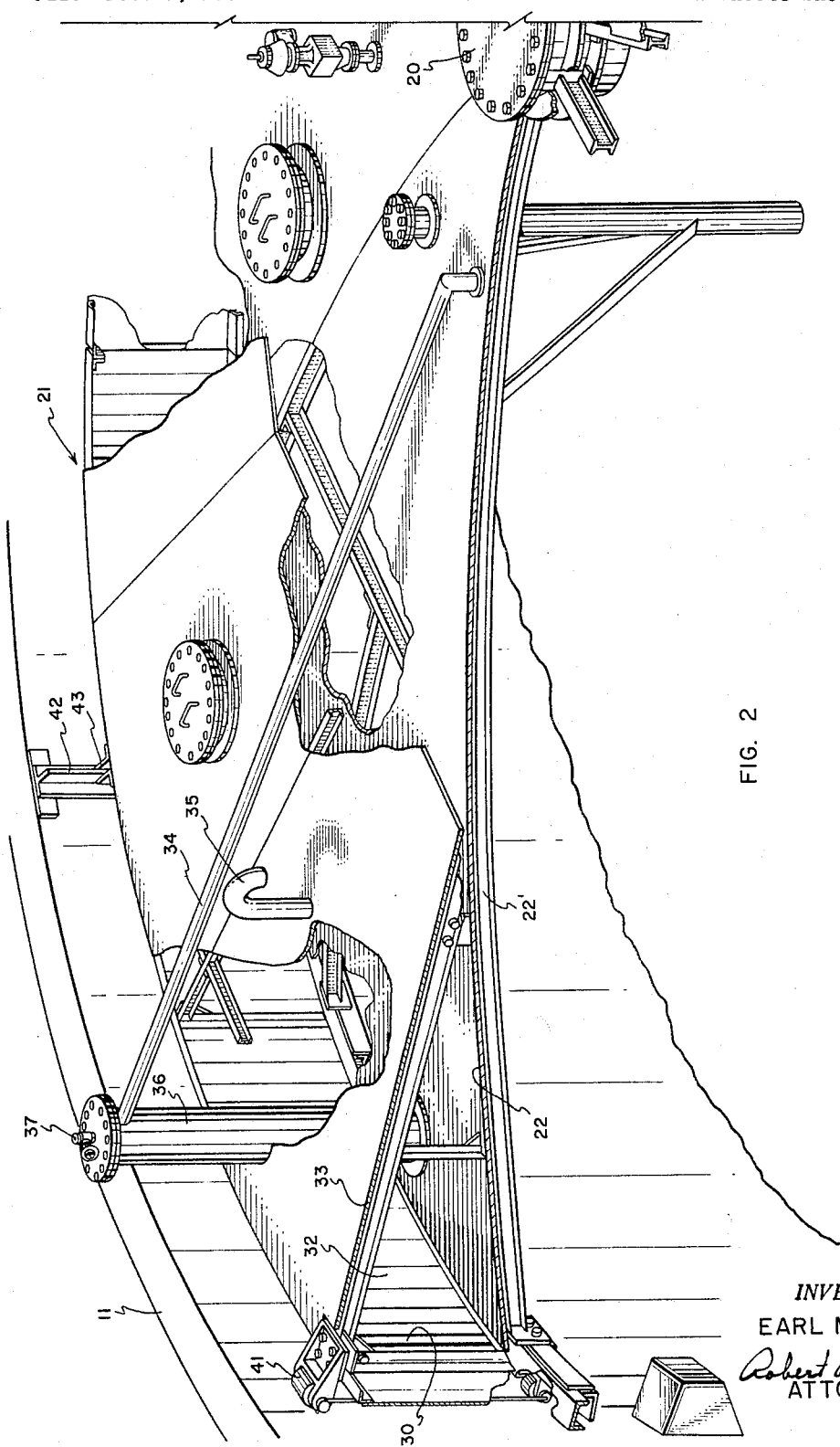
FIG. 2 is a partial view of a cover structure embodying the invention, certain parts being shown in section, others in elevation and portions being cut away to show details of construction.

Referring now to FIG. 1, the general structure includes a tank 10 having upstanding side walls 11 mounted on a usual sloping bottom 12 which may be provided with a bottom draw-off (not shown) for clean out. Material to be treated is introduced through a sludge feed pipe 13 while supernatant or treated material is withdrawn through a suitable conduit 14, here shown in the form of an elongated conduit generally parallel to the tank wall and having an inwardly directed elbow 16. The conduit is journalled in a packing gland 17 to be rotated by means of a handle and locking assembly 18 to position elbow 16 at varying levels. Residual sludge is withdrawn through a suitable conduit 15.

The cover of the invention, generally designated 21, comprises a basic shell 22 formed from sheet or plate as a dome substantially co-extensive with the area defined inside the tank walls. The cover is reinforced with preformed ribs 22'.

In the embodiment illustrated, the cover is provided with centrally located means 20 for accommodating a mixer 23 generally comprising a downwardly extending tube 24 which encloses an impeller 26. A suitable drive means 27 and deflector plate 28 are provided to induce and guide flow of the sludge. The mixing means, in combination with the dome cover provide an improved mixing assembly.

The mixer may be moved to other locations on the cover and one or more may be employed depending on the cover size. If the mixer is displaced from the center, suitable counter-weights may be provided by other mixers or ballast blocks properly located on the cover. For illustration, a ballast block is indicated in dotted lines at 31.

Turning now to details of the structure, the cover is rendered buoyant by an annular trough 32 essentially formed by a continuous vertical wall section 30 joined to and extending upwardly from the dome adjacent its periphery. An annular top 33 is fitted over the buoyant chamber or trough thus formed to seal it against filling with water or other debris.

The resulting structure has the effect and appearance of a sealed plenum chamber, but it will be understood that the basic buoyance is provided by the trough 32 formed between wall 30 and dome 22. In the illustrated embodiment, the top cover 33 serves as a guard. However, the invention also contemplates utilizing a completely sealed plenum chamber suitable for pressurizing if the additional buoyance thereby provided is desired.

In the case of non-pressured chambers, as will be usual for outside installations, an open-ended vent tube 35 is provided to maintain atmospheric pressure to thus prevent pressure build-up or decrease as would occur with temperature changes. The downward curve or gooseneck on the vent tube blocks entry of water.

Gas removal may be accomplished through conduit 34 which conducts gas via a suitable bonnet 36, valve 37 and flexible conduit 38 for discharge or supply to a gas burner as is usual in such cases. A suitable pressure and vacuum relief valve is generally employed. Alternatively, a gas take-off conduit (not shown) may extend upwardly from the tank into the bonnet, conduit 34 serving as a pressure equalizer. If desired, conduit 29 may be used to discharge gas directly from the center of the dome.

To facilitate vertical travel, guide rollers 41 are located at the cover periphery. The rollers also maintain spacing of the cover with respect to the tank wall.

To limit cover rotation, a plurality of guide strips 42 are rigidly mounted on the tank to mate with complemental channel strips 43 on the cover.

As previously noted, the buoyant chamber or trough 32 is an integral part of the cover itself and is spaced radially from the center thereof. Sufficient depth on the vertical wall 30 must be provided to insure buoyancy capable of supporting the entire cover weight along with any auxiliaries that may be secured thereto. The size and configuration to obtain the required displacement may be accurately pre-determined having due regard to the cover weight and the specific gravity of the material to be treated.

Corbels 45 on the tank wall limit downward travel of the cover and support it during periods of clean-out.

In connection with mixing, it is noted that liquid flow may be maintained in either direction. That is to say, the induced flow may be downward from the top of the mixing tube, entry being through spaces between tube support bars 48, or vice versa.

The solid line arrows 44 on the right hand side of FIG. 1 indicate flow pattern for downward flow whereas the dashed arrows 46 on the left side of the figure illustrates an upflow. In both cases the pattern is uninterrupted, the flow being facilitated by the dome. It will be noted that the flow pattern is generally circular between the top and bottom of the liquid mass and is enhanced by the cover which actually forms a mixing assembly when combined with the flow-inducing mixer.

Although the invention has been described as embodied in a circular tank, it is obvious that the form may be other than circular for utilization in tanks of rectangular or other form. The important requirement is that the cover be upwardly arched adjacent its periphery to enable formation of the annular buoyant chamber. However, the circular form is preferred for ease of construction and the generally desirable flow patterns obtained thereby.

I claim:

Apparatus for treating putrescible sludges to effect gas evolution concomitantly with the production of other digestive products comprising:
  a circular tank formed with a bottom and a vertical sidewall;
  a domed cover received in said tank within the confines of the wall for vertical movement therein, said cover including a rigid continuously concave shell, a buoyant trough means associated therewith formed by a continuous wall section extending upwardly from the periphery of said concave shell to define a trough with the upper surface thereof, a cover section for said trough extending inwardly from said continuous wall section, means for venting said trough associated with said cover section, a downwardly extending mixing means attached to said concave shell; and means located in said shell for withdrawing gaseous digestion products;
  means for withdrawing liquid digestion products from said tank;
  means for withdrawing sludge from said tank; and
  means for introducing feed to said tank.

References Cited by the Examiner
UNITED STATES PATENTS

| | | | |
|---|---|---|---|
| 1,888,079 | 11/1932 | Haupt | 220—26 |
| 1,904,339 | 4/1933 | Wiggins | 220—26 |
| 1,912,595 | 6/1933 | Schlenz | 210—197 X |
| 1,919,634 | 7/1933 | Haupt et al. | 220—26 |
| 1,989,589 | 1/1935 | Fischer | 210—14 |
| 2,008,686 | 7/1935 | Day | 220—26 |
| 2,538,412 | 1/1951 | Cecil et al. | 210—221 X |

REUBEN FRIEDMAN, *Primary Examiner.*

HERBERT L. MARTIN, *Examiner.*

F. MEDLEY, R. A. CATALPA, *Assistant Examiners.*